L. DRESCHER.
GALVANIC BATTERY.
No. 9,447. Patented Dec. 7, 1852.
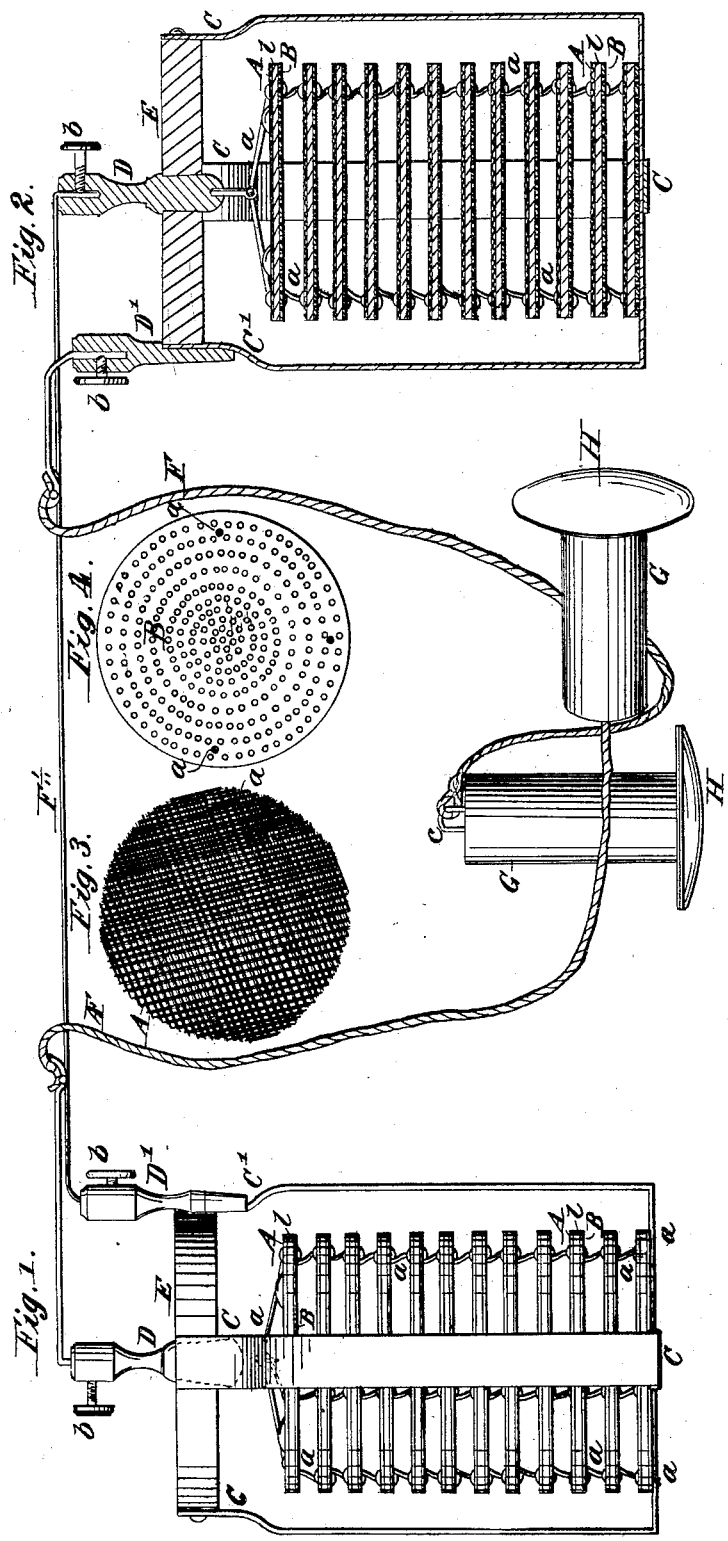

UNITED STATES PATENT OFFICE.

LOUIS DRESCHER, OF NEW YORK, N. Y.

IMPROVED GALVANIC BATTERY.

Specification forming part of Letters Patent No. 9,447, dated December 7, 1852.

*To all whom it may concern:*

Be it known that I, LOUIS DRESCHER, of the city, county, and State of New York, have invented a new and useful Improvement in Galvanic Batteries for Surgical Purposes, such as blistering and the extraction of humors and pains from the teeth and any part of the body; and I do hereby declare that the following is a full, clear, and exact description of the same, reference being had to the annexed drawings, making a part of this specification, in which—

Figure 1 is an elevation of a battery or pile of twelve double plates. Fig. 2 is a vertical section of a like pile taken through the center, the two piles or batteries, Figs. 1 and 2, being connected together by a conducting-wire. Fig. 3 is a plan view of the negative plate. Fig. 4 is a plan view of the positive plate or generator.

The same letters of reference indicate like parts in all the figures.

The nature of my invention consists in forming a galvanic battery or pile of several pairs of electric generators, each pair being formed with the negative—one made of copper, platina, or other metal gauze, and the positive generator made of zinc gauze or thin zinc-plate finely perforated—and having each pair separated by a thin strip of leather or flannel and not connected by a metal conductor. Each pair of generators is connected to the next pair in a pile by a fine metal conductor to carry the full current of electricity generated by each pair only by a metal conductor, and to have no secondary current passing from pair to pair by a fluid conductor in the pile, as is common in all other batteries. Each battery or pile is composed of eleven or twelve pairs of plates, each pair forming a separate battery, and having all its electricity carried off by the metallic conductor. The generators have an extensive surface to generate a current of great intensity, and they occupy a small space.

The object of the invention is to have a powerful battery which can be carried in a physician's instrument-box or pocket, to apply the same upon patients for raising blisters and removing humors, &c.

To enable others skilled in the art to make and use my invention, I will proceed to describe fully its construction and operation.

A, Fig. 3, is a piece of thin metal gauze about two inches in diameter.

B, Fig. 4, is a piece of thin zinc perforated with fine holes, or it may be a piece of zinc gauze. Each pair of copper and zinc generators A B forms an organic pile; but I arrange about twelve pairs together to form one battery, as represented by Figs. 1 and 2. Each pair of generators has a thin disk of leather, *l*, placed between them. No single pair A B are united together by a metal conductor, as in galvanic batteries which are in common use. The different pairs of generators are united together at three different places by little pieces of copper wire, *a a a*. These pieces of wire are soldered to the generators, one end of each piece of wire being soldered to a positive and the other to a negative generator. These pieces of wire bind all the generators together, and then they are all compactly held together by four thin strips of copper, C C C C', which cross one another, the generators being inside. The pieces of wire *a a a* which unite the separate pairs of generators and bind them together are united to the strips of copper C C C C' at the bottom, and at the top three pieces of wire, *a a a*, are gathered together and united to the brass connector D, as seen in Fig. 2.

E is a disk of wood or some non-conducting substance. The strips of copper C C C C' are painted on the outside or are varnished.

D' is the positive connector, as the wires from the lower zinc generator B are united to the copper strips C C C C', and the connector D' is united by a piece of solder or otherwise to form a metallic connection with the strip C'. The upper and lower generators are therefore united by metallic conductors to the connecting-screws D D', so as to carry the current from the battery when the circuit is formed with one battery or with any number of such batteries. The Figs. 1 and 2 show how two such batteries are connected together by the copper conductor F'. The leather disks are not conductors until they are moistened.

*b b b b* are thumb-screws for securing the circuit-wires in the conductors.

F F are two pieces of fine flexible wire cord covered with silk. They are conductors, and are united to the positive conductor D' of one battery and the negative conductor D of the other battery. Each wire cord F is united to to a metal conductor, *c*, in the inner end of each handle G. The outer end, H, of each handle is a metal button of brass or lead. The handles are cc x, dry wood, or some other non-conducting material. By this construction of battery, owing to the extensive surface of the generators, but especially owing to the manner in which the several pairs are united together only by fine metal conductors, they generate and conduct to the main circuit-wire a current of far greater electrical force within the same space than any other battery heretofore constructed, and it is especially applicable and useful to physicians and for physical purposes by its portable and effective character.

Operation and use: When I wish to blister a patient I merely take a battery and dip it into a solution of salt and water, or into a solution of acetic acid, or any weak acid; then take it out and set it upon the table. Whenever chemical action takes place by the oxidization of the metal generators the battery is then ready to be applied.

I will describe the method of applying the two batteries represented in the drawings, supposing the two batteries to have been dipped in the salt or acid solution, and the leather disks b made moist and rendered conductive and capable of supplying the acidulous solution to the plates for some time. I then make the patient take the handle of the negative pole, with the metal button H held firm in the middle of the left hand, and then, with the right hand holding the non-conducting handle, apply the other metal button H of the positive pole to the place to be operated upon. In a very few seconds the skin becomes red, and in a few minutes a blister or vesicle will appear on the spot to which the positive button H has been applied. Three of such small batteries as those represented and described act rapidly and in a very superior and far more effectual manner than Spanish flies or mustard, or any of the means now employed by physicians for raising blisters. The effect upon the patient is far more powerful, effectual, and remedial than by any other plan heretofore practiced, for the electric current passes entirely through the patient's body, it being a conductor and forming part of the galvanic battery.

A method to remedy the pains of tooth-ache is to apply the electrical current in the same way as that described to the root of the tooth, on the outside of the gum. In a few minutes a small blister will arise (if only a small piece of the button is applied to the tooth) and the pain will cease. The vesicle or blister generally contains humor, and this is a sign of the efficacy of this application of electricity for the removal of disease, for it is a presumptive sign of a disorganization, disarrangement, or morbid affection in that place where a patient feels pain.

This improvement, I believe, is destined to create a beneficial revolution in the surgical art, and it may yet be applied successfully to far more branches of the healing art than those I have mentioned.

What I claim as my invention, and desire to secure by Letters Patent, is—

The within-described improved arrangement of the old voltaic pile, the same consisting in so separating each galvanic pair from that next it in the series, and connecting them with short wires, and forming the plates with suitable perforations as that the strips of leather or flannel, or their equivalent, may be at once saturated with the exciting-liquid by immersing the battery therein.

LOUIS DRESCHER.

Witnesses:
  O. D. MUNN,
  S. H. WALES.